United States Patent
Lee et al.

(10) Patent No.: US 8,279,370 B2
(45) Date of Patent: Oct. 2, 2012

(54) OPTICAL LAMINATE FILM, BACKLIGHT UNIT INCLUDING THE SAME, AND LIQUID CRYSTAL DISPLAY INCLUDING THE SAME

(75) Inventors: Jin Woo Lee, Uiwang-si (KR); Gyu Chan Cho, Uiwang-si (KR); Sun Hong Park, Uiwang-si (KR); Sei Jin Oh, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 136 days.

(21) Appl. No.: 12/946,041

(22) Filed: Nov. 15, 2010

(65) Prior Publication Data

US 2011/0116014 A1    May 19, 2011

Related U.S. Application Data

(63) Continuation of application No. PCT/KR2008/007784, filed on Dec. 30, 2008.

(30) Foreign Application Priority Data

May 15, 2008  (KR) .......................... 10-2008-0045111

(51) Int. Cl.
G02F 1/1335 (2006.01)
G09F 13/04 (2006.01)
G02B 5/30 (2006.01)
G02B 5/02 (2006.01)

(52) U.S. Cl. .............. 349/64; 349/56; 349/57; 349/112; 349/95; 359/488.01; 362/97.2

(58) Field of Classification Search ............. 349/56, 349/57, 64, 95, 89, 88, 90, 93, 94, 105, 106, 349/112, 113, 118, 128, 129, 187; 359/488.01; 264/1.7, 1.34; 362/97.2
See application file for complete search history.

(56) References Cited

U.S. PATENT DOCUMENTS

| 5,745,199 | A * | 4/1998 | Suzuki et al. ............... 349/95 |
| 6,339,459 | B1 * | 1/2002 | Ichikawa et al. ............ 349/95 |
| 6,351,334 | B1 * | 2/2002 | Hsieh et al. ............... 359/571 |
| 7,841,730 | B2 * | 11/2010 | Hara et al. ................. 362/19 |
| 8,035,774 | B2 * | 10/2011 | Ouderkirk et al. .......... 349/96 |
| 2009/0128737 | A1 | 5/2009 | Ouderkirk et al. |
| 2011/0116014 | A1 * | 5/2011 | Lee et al. ................... 349/64 |

FOREIGN PATENT DOCUMENTS

| JP | 2004-309557 A | 11/2004 |
| KR | 10 2008-0010419 A | 1/2008 |
| KR | 10 2008-0037905 A | 5/2008 |

* cited by examiner

Primary Examiner — Brian Healy
(74) Attorney, Agent, or Firm — Lee & Morse, P.C.

(57) ABSTRACT

An optical laminate film, a backlight unit, and a liquid crystal display module, the optical laminate film including a multi-layer film composed of multiple layers including at least two polymers having different refractive indexes, the multilayer film transmitting only a light component vibrating in a direction parallel to one transmittance axis while reflecting other light components; an embossed diffusing film laminated on one side of the multilayer film, the embossed diffusing film having roughness on a surface thereof; and a microlens film laminated on another side of the multilayer film, the microlens film having microlenses arranged on a surface thereof.

19 Claims, 3 Drawing Sheets

OPTICAL LAMINATE FILM, BACKLIGHT UNIT INCLUDING THE SAME, AND LIQUID CRYSTAL DISPLAY INCLUDING THE SAME

CROSS-REFERENCE TO RELATED APPLICATION

This application is a continuation of pending International Application No. PCT/KR2008/007784, entitled "Optical Laminated-Film with Higher Brightness," which was filed on Dec. 30, 2008, the entire contents of which are hereby incorporated by reference.

BACKGROUND

1. Field

Embodiments relate to an optical laminate film, a backlight unit including the same, and a liquid crystal display including the same.

2. Description of the Related Art

Generally, liquid crystal displays (LCDs) may be used as flat panel displays for applications, e.g., mobile phones, PDAs, computers, TVs, and other information display devices, and may have merits, e.g., compactness, light weight, low power consumption, and the like.

Although the liquid crystal displays may have various characteristics according to applications thereof, it is generally desirable to have, e.g., high brightness, wide viewing angle, low energy consumption, compactness, light weight, and the like. In particular, the LCDs should have high brightness.

High brightness of the LCD may be accomplished by increasing brightness of a light source per se or by increasing light utilization efficiency. However, increasing the brightness of the light source may increase energy consumption. Further, increasing light utilization efficiency may accomplish high brightness without increasing energy consumption.

To increase light utilization efficiency, light emitted from a backlight unit may be recycled into available polarized light that is not absorbed into LCD elements, thereby increasing the brightness.

SUMMARY

Embodiments are directed to an optical laminate film, a backlight unit including the same, and a liquid crystal display including the same.

At least one of the above and other features and advantages may be realized by providing an optical laminate film including a multilayer film composed of multiple layers including at least two polymers having different refractive indexes, the multilayer film transmitting only a light component vibrating in a direction parallel to one transmittance axis while reflecting other light components; an embossed diffusing film laminated on one side of the multilayer film, the embossed diffusing film having roughness on a surface thereof; and a microlens film laminated on another side of the multilayer film, the microlens film having microlenses arranged on a surface thereof.

The embossed diffusing film may have a surface roughness Ra of about 0.5 µm to about 3 µm and a height distribution index HDI of about 3 µm to about 8 µm.

The embossed diffusing film, the multilayer film, and the microlens film may be disposed in this sequence relative to a light source.

The embossed diffusing film may be on a light entrance side of the optical laminate film and the microlens film may be on a light exit side of the optical laminate film.

The embossed diffusing film may have a haze degree of at least about 70% and a total luminous transmittance of at least about 88%.

The embossed diffusing film may have a retardation value of about 1 nm to about 25 nm.

The microlenses arranged on the surface of the microlens film may each have a diameter of about 20 µm to about 200 µm.

The microlenses of the microlens film may have a height to radius (H/R) ratio of about 0.5 to about 1.2.

The microlenses arranged on the surface of the microlens film may have a gap of about 0.1 µm to about 20 µm therebetween.

The embossed diffusing film may have a surface roughness Ra of about 0.5 µm to about 3 µm and a height distribution index HDI of about 3 µm to about 8 µm.

The embossed diffusing film may have a retardation value of about 1 nm to about 25 nm.

The microlenses on the surface of the microlens film may be arranged to form an equilateral triangle lattice pattern thereon.

The microlenses of the microlens film may have a height to radius (H/R) ratio of about 0.5 to about 1.2.

The microlenses arranged on the surface of the microlens film may have a gap of about 0.1 µm to about 20 µm therebetween.

The microlenses of the microlens film may have non-uniform diameters of about 20 µm to about 200 µm and may be arranged with irregular gaps of about 0.1 µm to about 20 µm therebetween.

The embossed diffusing film and the microlens film may each independently include a thermoplastic resin.

The thermoplastic resin may include at least one of methacrylate resin, styrene resin, cycloolefin resin, and polycarbonate resin.

At least one of the above and other features and advantages may also be realized by providing a backlight unit including a light source; and the optical laminate film of an embodiment, the optical laminate film being disposed such that a surface of the embossed diffusing film is provided at a light entrance plane and a surface of the microlens film is provided at a light exit plane.

At least one of the above and other features and advantages may also be realized by providing a liquid crystal display module including a liquid display panel; and the backlight unit of an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
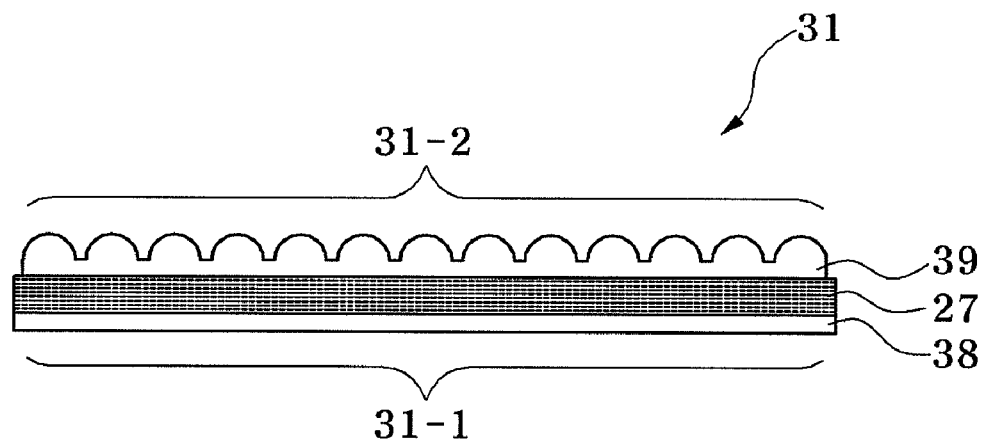
FIG. 1 illustrates a cross-sectional view of an optical laminate film according to an embodiment.

Korean Patent Application No. 10-2008-0045111, filed on May 15, 2008, in the Korean Intellectual Property Office, and entitled: "Optical Laminated-Film With Higher Brightness," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a cross-sectional view of an optical laminate film according to an embodiment. In FIG. 1, the optical laminate film according to the present embodiment may include an embossed diffusing film 38 and a microlens film 39 laminated on opposite sides of a multilayer film 27, respectively.

The multilayer film 27 may be composed of multiple layers of at least two polymers having different refractive indexes, and may only transmit a light component vibrating in a direction parallel to one transmittance axis while reflecting other light components. For example, the multilayer film 27 may include a first layer formed of a first polymer having a first refractive index and a second layer farmed of a second polymer having a second refractive index, the first refractive index being different from the second refractive index. The light reflected by the multilayer film 27 may be directed toward a light source 11 (see FIG. 2), and may be returned back to the multilayer film 27 by a reflector, e.g., a reflector sheet near the light source. For example, an intensity of polarized light passing through the multilayer film 27 may be increased by repeating transmission and reflection as mentioned above.

Figure 7:
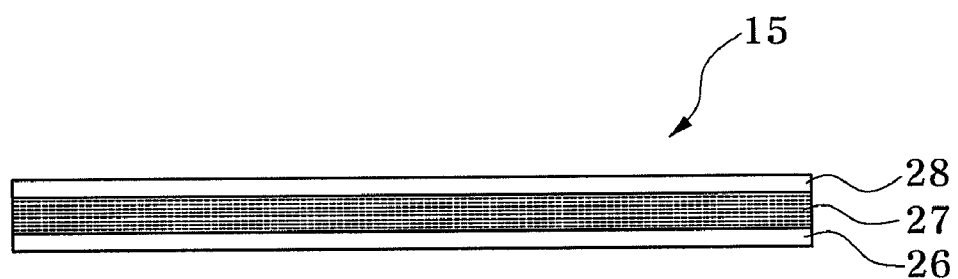
FIG. 7 illustrates a cross-sectional view of the optical laminate film of FIG. 6.

Referring to FIG. 7, in another optical laminate film 15, first and second diffusing films 26 and 28 may have the same optical characteristics and may be disposed on upper and lower surfaces of the multilayer film 27. Both the first and second diffusing films 26 and 28 may be subjected to matting or embossing to provide surfaces for light diffusion. A major diffusing plane of the first diffusing film 26 may be formed on a light entrance plane of the first diffusing film 26. A major diffusing plane of the second diffusing film 28 may be formed on a light exit plane of the second diffusing film 28.

Referring again to FIG. 1, according to the present embodiment, the optical laminate film 31 may enhance light utilization efficiency with the films having different optical characteristics on the opposite surfaces of the multilayer film 27.

As described above, the optical laminate film 31 according to the present embodiment may include the embossed diffusing film 38 and the microlens film 39 on opposite sides of the multilayer film 27, respectively. The embossed diffusing film 38 may be provided at a light entrance plane 31-1 and the microlens film 39 may be provided at a light exit plane 31-2.

Figure 2:
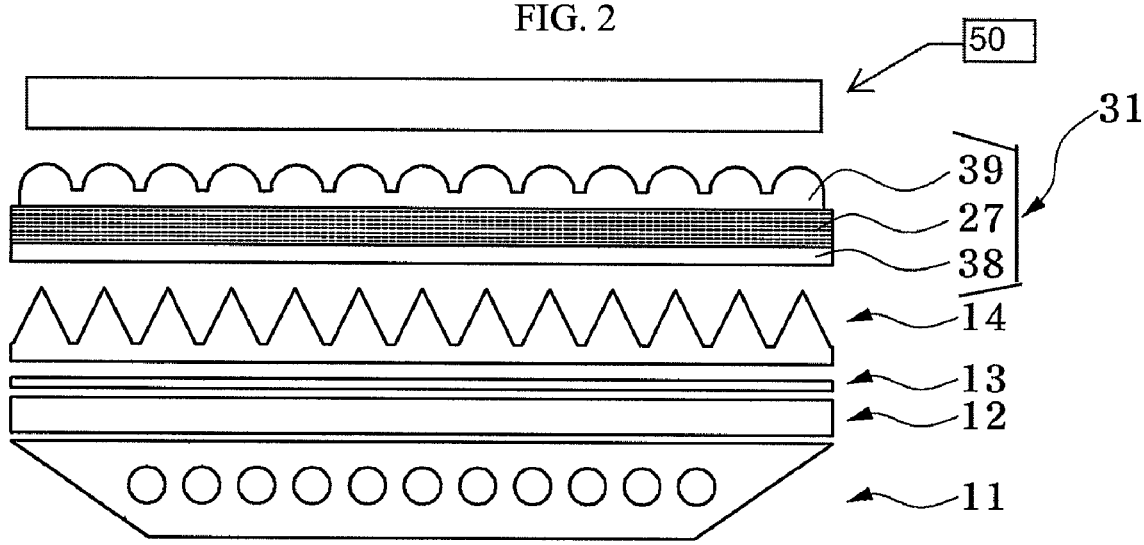
FIG. 2 illustrates a cross-sectional view of a liquid crystal display module having a backlight unit including an optical laminate film according to an embodiment.

FIG. 2 illustrates a cross-sectional view of a liquid crystal display module having a backlight unit including an optical laminate film according to an embodiment. The liquid crystal display module may include a liquid crystal panel 50 on the backlight unit.

In FIG. 2, after light emitted from the light source 11 passes through a diffuser sheet 12, a diffusing film 13, and a prism film 14, the light may pass through the optical laminate film 31 according to the present embodiment. In the optical laminate film 31, the light may pass through the embossed diffusing film 38, the multilayer film 27, and the microlens film 39 in this sequence.

For example, in the optical laminate film 31 according to the present embodiment, light may enter the embossed diffusing film 38 and may exit from the microlens film 39.

A bonding material for overlapping the multilayer film 27, the embossed diffusing film 38, and the microlens film 39 with each other is not limited to a particular material. Examples of the bonding material may include a pressure sensitive adhesive, a heat sensitive adhesive, a volatile solvent adhesive, and the like. A curable adhesive may be used as the bonding material for this purpose.

The embossed diffusing film 38 may be provided with an embossed pattern, which may form roughness on a surface of the diffusing film 38 for achieving superior optical diffusivity and optical transmittance, thereby facilitating diffusion of light incident thereon with higher efficiency.

A major diffusing plane having the embossed pattern of the diffusing film 38 may be provided to the light entrance plane 31-1 of the optical laminate film 31.

The embossed diffusing film 38 may be formed by passing a molten resin through a nip between a rubber roll and an emboss roll subjected to sand blasting to have a surface roughness Ra of about 0.5 μm to about 3 μm and a height distribution index HDI of about 3 μm to about 8 μm.

Maintaining the Ra at about 0.5 μm or greater and the HDI at about 3 μm or greater may help ensure that desired haze properties are achieved. Maintaining the Ra at about 3 μm or less and the HDI at about 8 μm or less may help ensure that total luminous transmittance is maintained and variation of light transmittance on the diffusing film is avoided. For example, maintaining Ra at about 0.5 to about 3 μm and the HDI at about 3 to about 8 μm may help ensure that it is possible to achieve a haze degree of about 70% or more and a superior total luminous transmittance of about 88% or more.

Further, the embossed diffusing film 38 according to the present embodiment may have a low retardation value of, e.g., about 1 nm to about 25 nm. Maintaining the retardation at about 25 nm or less may help ensure that the diffusing film 38 does not experience a severe transmittance loss in the visible range, thereby maintaining brightness of the liquid crystal display unit.

The embossed diffusing film 38 may be formed of a thermoplastic resin.

The thermoplastic resin may include any suitable thermoplastic resin that is able to be processed by extrusion molding. Examples of the thermoplastic resin may include polyacetal resin, acrylic resin, polycarbonate resin, styrene resin, polyester resin, vinyl resin, polyphenylene ether resin, polyolefin resin, acrylonitrile-butadiene-styrene copolymer resin, polyethersulfone resin, phenylene sulfide resin, fluorine resin, and the like.

When considering properties and applications of thermoplastic resin compositions, a transparent polymer resin, e.g., methacrylate resin, styrene resin, cycloolefin resin, polycarbonate resin, and the like, may be used for the embossed diffusing film. In an implementation, the embossed diffusing film may be formed of copolymers or combinations thereof.

Figure 3:
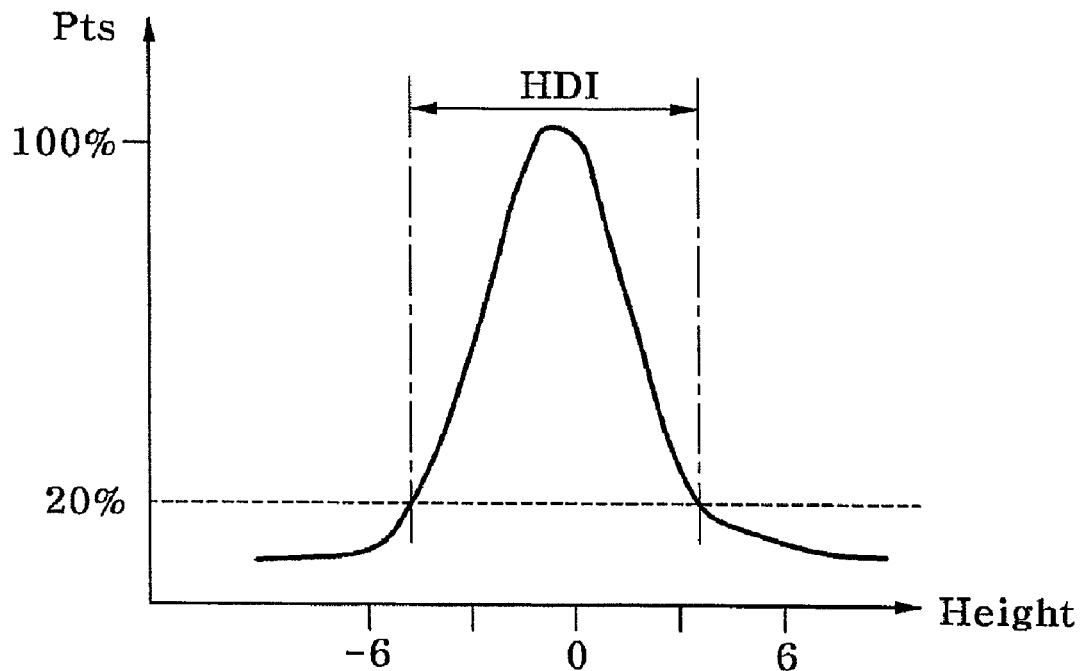
FIG. 3 illustrates a graph depicting individual distribution of a surface height of a sample for defining HDI.

FIG. 3 illustrates a graph depicting individual distribution of a surface height of a sample for defining the HDI.

The HDI is defined by a length of a main distribution width in an obtained surface height distribution for analysis of surface roughness of a sample. In FIG. 3, the x-axis indicates individual surface heights of a sample and the y-axis indicates the number of data points corresponding to the individual surface heights. Herein, the HDI will be defined by a length of a width distribution of heights pertaining to 20% of heights in the largest distribution within a unit area of 600×80 μm, which can be expressed as the main distribution width of the surface heights and can be obtained by, e.g., a Wyko profiler or the like.

Figure 4:
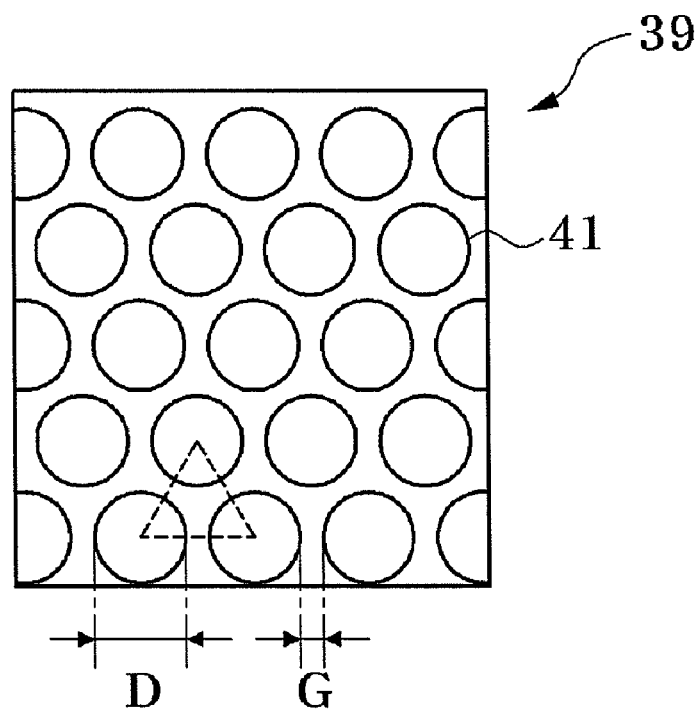
FIG. 4 illustrates a top view of a microlens film according to an embodiment.

FIG. 4 illustrates a top view of a microlens film according to an embodiment.

Figure 5:
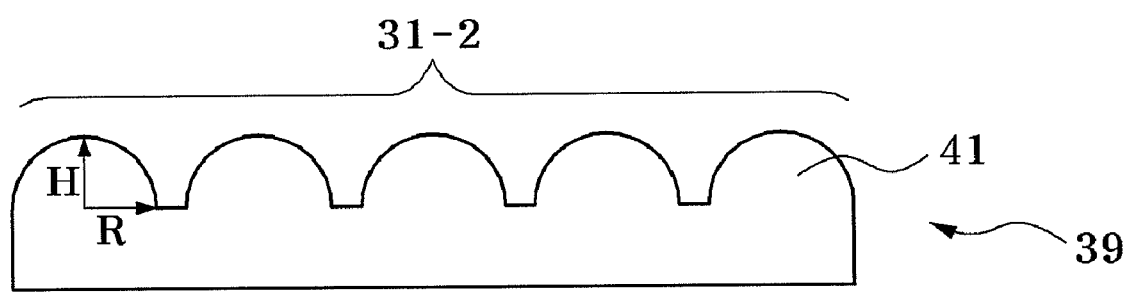
FIG. 5 illustrates a cross-sectional view of the microlens film according to an embodiment.

FIG. 5 illustrates a cross-sectional view of the microlens film according to an embodiment.

As shown in FIGS. 4 and 5, the microlens film 39 may be provided to one side of the optical laminate film 31 and may include a plurality of microlenses 41 on a surface of the light exit plane 31-2 of the optical laminate film 31, e.g., the surface from which light exits. The microlenses 41 may have a hemispherical lens shape and may be densely arranged on the surface of the microlens film 39.

FIG. 4 illustrates microlenses 41 arranged to constitute an equilateral triangle lattice pattern. When the microlenses are arranged to constitute the equilateral triangle lattice pattern between each other, it is possible to obtain the densest arrangement of the microlenses 41 per unit area.

In an implementation, the microlenses 41 may have a non-uniform size while being irregularly arranged in order to prevent a Moire phenomenon, which may occur when an optical film overlaps other optical members.

The microlenses 41 may each have a diameter D of about 20 μm to about 200 μM. Maintaining the diameter of the microlenses 41 at about 20 μm or greater may help ensure that the respective microlenses do not have excessive influence, that unfavorable conditions in accomplishment of large area are prevented, and that other disadvantages in terms of techniques and costs are avoided. Maintaining the diameter of the microlens 13 at about 200 μm or less may help ensure that a thickness of the microlens film 39 is not increased, that brightness variation leading to quality deterioration is avoided, and that the Moire phenomenon between the microlens film 39 and a liquid crystal cell is prevented.

The microlens 41 may have a ratio of height H to radius R of curvature, e.g., an H/R ratio, of about 0.5 to about 1.2. Maintaining the H/R ratio at about 0.5 to about 1.2 may help prevent concentration of light outside an optimal light concentration range and brightness deterioration. In an implementation, a gap G between the microlenses 41 may be about 0.1 μm to about 20 μm. Maintaining the gap G between the microlenses at about 0.1 μM or greater may help prevent a spreading defect between the microlenses during manufacture of the film as well as brightness deterioration. Maintaining the gap G at about 20 μm or less may help ensure that an area occupied by the microlenses 41 is not lowered, thereby ensuring sufficient brightness.

The microlens film 39 may be formed by an extrusion molding process in which a molten resin is passed through a nip between a roll having an inverse image of the microlenses on the microlens film 39 and another roll such that the inverse image of the roll may be transferred to the microlens film 39. The roll having the inverse image of the microlenses may be fabricated by a general etching process.

Like the embossed diffusing film 38, the microlens film 39 may be formed of a thermoplastic resin.

The thermoplastic resin may include any suitable thermoplastic resin that can be processed by extrusion molding. Examples of the thermoplastic resin may include polyacetal resin, acrylic resin, polycarbonate resin, styrene resin, polyester resin, vinyl resin, polyphenylene ether resin, polyolefin resin, acrylonitrile-butadiene-styrene copolymer resin, polyethersulfone resin, phenylene sulfide resin, fluorine resin, and the like.

When considering the properties and applications of thermoplastic resin compositions, a transparent polymer resin, e.g., methacrylate resin, styrene resin, cycloolefin resin, polycarbonate resin, and the like, may be used for the embossed diffusing film. In an implementation, the embossed diffusing film may be formed of copolymers or combinations thereof.

Next, the embodiments will be described in detail with reference to examples, which are given not for restriction of the embodiments but by way of illustration only.

Example 1

For Example 1, DBEF-P2 available from 3M was used as the multilayer film, and a film having a retardation value of 10 nm, as described in the above description, was used as the embossed diffusing film. The microlens film had microlenses having a diameter of 50 μm, an H/R ratio of 0.7, and a gap of 10 μm therebetween.

The embossed diffusing film and the microlens film were superimposed on opposite sides of the multilayer film using a curable adhesive, thereby providing an optical laminate film of Example 1. (see FIG. 1)

Then, after laminating the prepared optical laminate film of Example 1 on a diffuser sheet, a diffusing film, and a prism film sequentially stacked from a light source, as shown in FIG. 2, brightness of the optical laminate film was measured using a brightness measuring device (EZ-Contrast from Eldim Co., Ltd).

Here, the diffuser sheet was DRE361 available from Cheil Industries, Inc., the diffusing film was UTE II available from Mirae Nanotech Co., Ltd., and the prism film was BEF II available from 3M.

Example 2

For Example 2, DBEF-P2 available from 3M was used as the multilayer film, and a film having a retardation value of 8 nm, as described in the above description, was used as the embossed diffusing film. The microlens film had microlenses having a diameter of 100 μm, an H/R ratio of 0.9, and a gap of 5 μm therebetween.

After fabricating an optical laminate film of Example 2 by the same method as in Example 1, brightness of Example 2 was measured by the same method as in Example 1.

Example 3

For Example 3, the multilayer film and the embossed diffusing film had the same configurations as those of Example 1, and the microlens film had microlenses having a diameter of 180 μm, an H/R ratio of 1.0, and a gap of 10 μm therebetween.

After fabricating an optical laminate film of Example 3 by the same method as in Example 1, brightness of Example 3 was measured by the same method as in Example 1.

Comparative Example 1

For comparison with Example 1, an optical laminate film of Comparative Example 1 was fabricated using the same multilayer film as in Example 1 and included diffusing films having no separate optical shape, e.g., having the same optical shape, on opposite side of the multilayer film. Brightness of the device prepared according to Comparative Example 1 was measured by the same method as in Example 1.

Comparative Examples 2-6

After fabricating optical laminate films of Comparative Examples 2-6 with different H/R ratios of microlens films, different gaps between microlenses, and different retardations of embossed diffusing films of the optical laminate films, brightnesses thereof was measured by the same method as in Example 1.

Result Analysis

Results of brightness measurement of Examples 1 to 3 and Comparative Examples of 1 to 6 are shown in Table 1.

TABLE 1

|  | Microlens film | | | Embossed diffusing film | | | | | Assembled BLU |
|---|---|---|---|---|---|---|---|---|---|
|  | D μm | H/R | Gap μm | Retardation Nm | Ra μm | HDI μm | Haze % | Total luminous transmittance % | Brightness Cd/m² |
| E1 | 50 | 0.7 | 10 | 10 | 1.8 | 5 | 84 | 93 | 10,620 |
| E2 | 100 | 0.9 | 5 | 8 | 1.2 | 7 | 81 | 91 | 11,100 |
| E3 | 180 | 1.0 | 10 | 10 | 1.8 | 5 | 84 | 93 | 11,900 |
| CE1 | — | — | — | — | — | — | — | — | 8,610 |
| CE2 | 100 | 0.3 | 10 | 12 | 1.8 | 7 | 83 | 93 | 8,890 |
| CE3 | 100 | 0.3 | 2 | 13 | 1.9 | 8 | 84 | 92 | 8,990 |
| CE4 | 100 | 1.5 | 10 | 11 | 1.8 | 6 | 84 | 93 | 9,520 |
| CE5 | 100 | 0.9 | 30 | 10 | 1.8 | 5 | 84 | 93 | 9,100 |
| CE6 | 100 | 0.8 | 2 | 32 | 1.0 | 7 | 80 | 91 | 8,530 |

According to the embodiments, the microlenses may have a diameter of about 20 μm to about 200 μm, an H/R ratio of about 0.5 to about 1.2 and a gap of about 0.1 μm to about 20 μm between the microlenses, and the embossed diffusing film may have an Ra of about 0.5 μm to about 3 μm, an HDI of about 3 μm to about 8 μm, and a retardation value of about 1 nm to about 25 nm.

Examples 1 to 3 satisfied these conditions and exhibited brightnesses of 10,620 Cd/m², 11,100 Cd/m², and 11,900 Cd/m², respectively Comparative Example 1, which was fabricated by laminating the similar diffusing films, exhibited a brightness of 8,610 Cd/m². Therefore, it may be seen that the optical laminate films of the Examples provided higher brightness to a backlight unit under the same conditions.

Comparative Examples 2 to 4 had H/R ratios outside the range of about 0.5 to about 1.2 and exhibited lower brightnesses than those of Examples 1 to 3.

Comparative Example 5 had an excessively wide gap of 30 μm between the microlenses and exhibited a lower brightness than those of Examples 1 to 3.

Comparative Example 6 had a retardation value of 32 nm, which was greater than that of the Examples, and exhibited a lower brightness.

As described above, according to the embodiments, the optical laminate film may have modified surfaces of a light entrance plane and a light exit plane, thereby increasing utilization of light emitted from a light source. Further, the embodiments can reduce a number of optical films used in a backlight unit. Moreover, according to the embodiments, the optical laminate film may provide improved brightness with the same light source by increasing the utilization of light emitted from the light source, thereby lowering power consumption.

Figure 6:
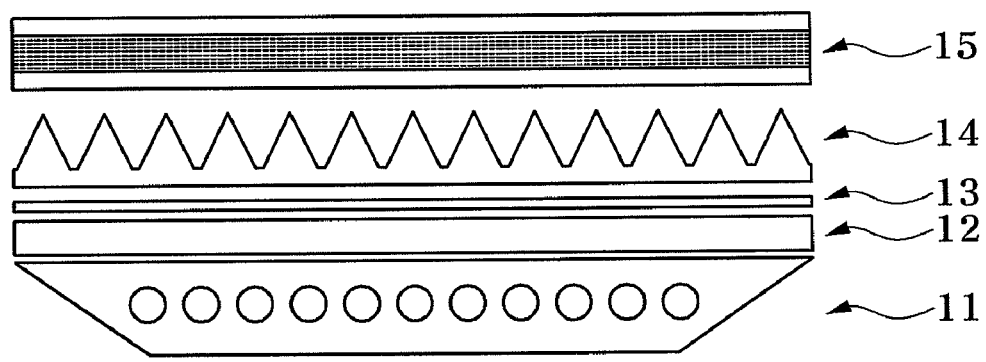
FIG. 6 illustrates a cross-sectional view of another backlight unit.

By comparison, FIG. 6 illustrates a cross-sectional view of another backlight unit. As illustrated in FIG. 6, the backlight unit may include the light source 11, the diffuser sheet 12, the diffusing film 13, the prism film 14, and an optical laminate film 15 (DBEF-D available from 3M), which may be sequentially laminated to overlap each other.

When emitted from the light source 11, light may be diffused or concentrated through the diffusing film 13 and prism film 14, and may then be recycled into polarized light through the optical laminate film 15. Here, the polarized light may not be absorbed into LCD elements, e.g., the polarized light may contribute to brightness improvement.

FIG. 7 illustrates a cross-sectional view of the optical laminate film of FIG. 6. Referring to FIG. 7, the optical laminate film 15 may include a multilayer film 27 at a middle region thereof, a first light diffusing film on a light entrance plane (light source side), and a second light diffusing film on a light exit plane (opposite to the light source side) in an overlapping structure. The first and second diffusing films 26 and 28 may be made of the same material and may not have a separate surface shape, i.e., are substantially planar or do not include microlenses.

In contrast to the embodiments of FIGS. 6 and 7, the embodiments of FIGS. 1 to 5 provide an optical laminate film that can significantly improve light utilization efficiency for higher brightness.

The embodiments of FIGS. 1 to 5 provide an optical laminate film that includes films on a light entrance plane and a light exit plane to provide different optical functions, respectively, thereby improving front brightness through minimization of light loss.

The embodiments provide an optical laminate film that can be applied to a backlight unit to improve front brightness, thereby reducing a required number of light sources and power consumption.

According to an embodiment, the optical laminate film may have modified surfaces of a light entrance plane and a light exit plane, thereby increasing utilization of light emitted from a light source.

Further, according to an embodiment, it is possible to reduce a number of optical films used in a backlight unit.

Further, according to an embodiment, the optical laminate film may provide high brightness with the same light source by increasing utilization efficiency of light emitted from the light source, thereby lowering power consumption.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An optical laminate film, comprising:
   a multilayer film composed of multiple layers including at least two polymers having different refractive indexes, the multilayer film transmitting only a light component vibrating in a direction parallel to one transmittance axis while reflecting other light components;
   an embossed diffusing film laminated on one side of the multilayer film, the embossed diffusing film having roughness on a surface thereof; and
   a microlens film laminated on another side of the multilayer film, the microlens film having microlenses arranged on a surface thereof.

2. The optical laminate film as claimed in claim 1, wherein the embossed diffusing film has a surface roughness Ra of about 0.5 μm to about 3 μm and a height distribution index HDI of about 3 μm to about 8 μm.

3. The optical laminate film as claimed in claim 1, wherein the embossed diffusing film, the multilayer film, and the microlens film are disposed in this sequence relative to a light source.

4. The optical laminate film as claimed in claim 1, wherein the embossed diffusing film is on a light entrance side of the optical laminate film and the microlens film is on a light exit side of the optical laminate film.

5. The optical laminate film as claimed in claim 1, wherein the embossed diffusing film has a haze degree of at least about 70% and a total luminous transmittance of at least about 88%.

6. The optical laminate film as claimed in claim 1, wherein the embossed diffusing film has a retardation value of about 1 nm to about 25 nm.

7. The optical laminate film as claimed in claim 1, wherein the microlenses arranged on the surface of the microlens film each have a diameter of about 20 μm to about 200 μm.

8. The optical laminate film as claimed in claim 7, wherein the microlenses of the microlens film have a height to radius (H/R) ratio of about 0.5 to about 1.2.

9. The optical laminate film as claimed in claim 8, wherein the microlenses arranged on the surface of the microlens film have a gap of about 0.1 μm to about 20 μm therebetween.

10. The optical laminate film as claimed in claim 9, wherein the embossed diffusing film has a surface roughness Ra of about 0.5 μm to about 3 μm and a height distribution index HDI of about 3 μm to about 8 μm.

11. The optical laminate film as claimed in claim 10, wherein the embossed diffusing film has a retardation value of about 1 nm to about 25 nm.

12. The optical laminate film as claimed in claim 1, wherein the microlenses on the surface of the microlens film are arranged to form an equilateral triangle lattice pattern thereon.

13. The optical laminate film as claimed in claim 1, wherein the microlenses of the microlens film have a height to radius (H/R) ratio of about 0.5 to about 1.2.

14. The optical laminate film as claimed in claim 1, wherein the microlenses arranged on the surface of the microlens film have a gap of about 0.1 μm to about 20 μm therebetween.

15. The optical laminate film as claimed in claim 1, wherein the microlenses of the microlens film have non-uniform diameters of about 20 μm to about 200 μm and are arranged with irregular gaps of about 0.1 μm to about 20 μm therebetween.

16. The optical laminate film as claimed in claim 1, wherein the embossed diffusing film and the microlens film each independently include a thermoplastic resin.

17. The optical laminate film as claimed in claim 16, wherein the thermoplastic resin includes at least one of methacrylate resin, styrene resin, cycloolefin resin, and polycarbonate resin.

18. A backlight unit, comprising:
   a light source; and
   the optical laminate film as claimed in claim 1, the optical laminate film being disposed such that a surface of the embossed diffusing film is provided at a light entrance plane and a surface of the microlens film is provided at a light exit plane.

19. A liquid crystal display module, comprising:
   a liquid display panel; and
   the backlight unit as claimed in claim 18.

* * * * *